Aug. 19, 1958     D. L. STINSON     2,848,052
PROCESS FOR VERTICAL FRACTURING
Filed Nov. 19, 1954
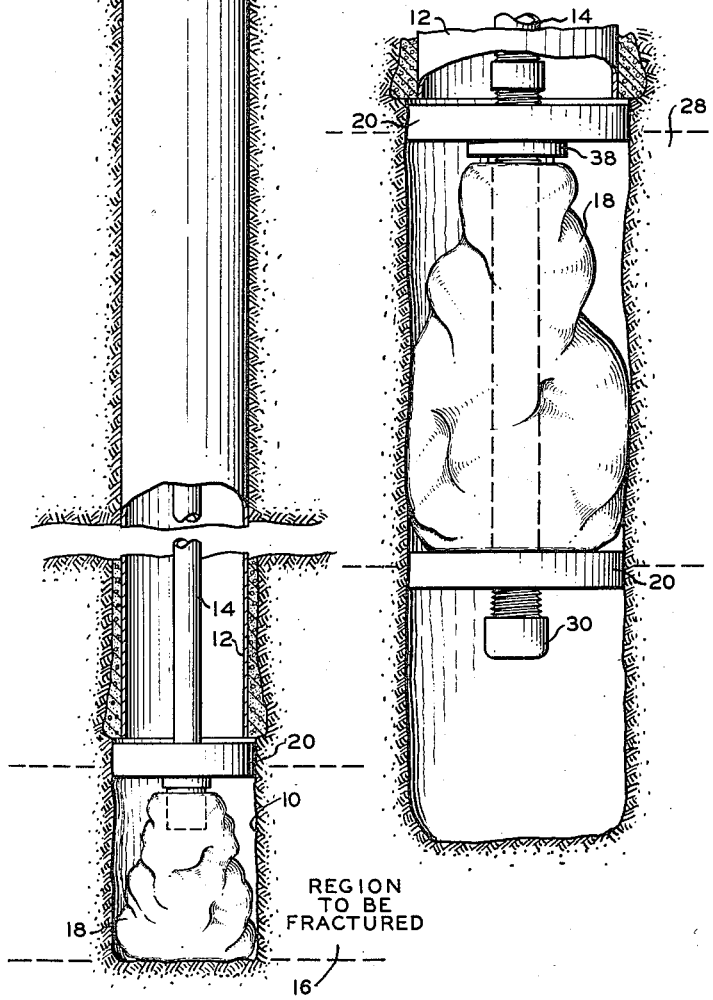
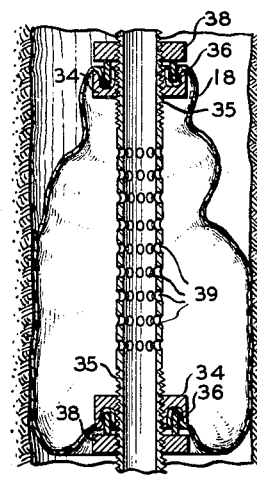
INVENTOR.
D. L. STINSON
BY *Hudson & Young*
ATTORNEY United States Patent Office 2,848,052
Patented Aug. 19, 1958

2,848,052

PROCESS FOR VERTICAL FRACTURING

Donald L. Stinson, Bartlesville, Okla., assignor to Phillips Petroleum Company, a corporation of Delaware Application November 19, 1954, Serial No. 470,054

8 Claims. (Cl. 166—42)

This invention relates to a process and apparatus for effecting hydraulic fracturing of a productive formation in a well bore to produce oil from said formation. A specific aspect of the invention pertains to a process for effecting vertical fracturing of a well formation by hydraulic means.

In conventional hydraulic fracturing the more porous zones in a production region or formation tend to fracture more than the less porous zones because they take most of the fluid horizontally. Of course, it is desirable to fracture the less porous zones to increase production therefrom. Vertical fracturing of the formation is considered more desirable than horizontal fracturing because of the opening up of the less porous zones to production, along with the more porous zones.

The producing region in a number of oil fields contains numerous streaks which will absorb or take up the fracturing oil and sand more readily than the less porous zones. This is particularly true in the Spraberry Field in west Texas. In that field a method of fracturing has been developed in which large volumes of oil and sand are pumped rapidly under high pressure into the formation to be fractured. In a typical operation about 200–300 barrels of crude oil is injected into the well thru a special manifold connected with the well head, using 8 pump trucks simultaneously pumping the oil into the well head. The initial injection is followed with a smaller quantity of heavy refined oil and after this is pumped into the well a mixture of about 20,000 gallons of refined oil containing a suspension of about 20,000 pounds of sand is rapidly injected. The first run of oil is free of sand because of the danger that the sand might settle out of the oil, if it were run first, while the fluid is static in the hole before pressure increases and the formation begins taking the fluid. The oil-sand mixture is followed immediately with about 500 barrels of crude oil, or about 200 barrels more than casing capacity, as a flushing medium to drive the sand deep into the formation and avoid plugging of the porous rock near the well bore.

In the type of operation described it is readily apparent that extremely large volumes of hydraulic fluid, such as crude and refined oil, are required in order to effect the desired fracturing. Even in this type of operation, because of the structure of the oil-bearing rock containing numerous horizontal streaks, the fracturing is largely horizontal.

The principal object of the invention is to provide a novel and improved process and apparatus for effecting hydraulic fracturing of an oil-bearing formation in a well bore. Another object of the invention is to provide a novel and improved process and apparatus for effecting vertical fracturing of an oil-bearing formation by hydraulic means. Another object of the invention is to decrease the amount of liquid required in the hydraulic fracturing of a well formation. It is also an object of the invention to prevent fractures from following the loose streaks in a formation with fracturing in a horizontal direction. Other objects of the invention will become apparent from a consideration of the accompanying disclosure.

In accordance with one embodiment of the invention, a tough flexible impervious sack, adapted to contact the walls of the borehole as a "liner," is positioned on the well tubing at the level of a potentially productive formation and is confined within vertical limits to prevent substantial vertical expansion of the sack, and the fracturing is accomplished by forcing a suitable liquid under substantial pressure thru the tubing and into the sack which seals off the formation until sufficient pressure is built up to cause the formation to fracture. Once the formation has fractured the strength of the sack is insufficient to confine the fluid and the fracturing process proceeds as usual. When the formation to be fractured is at the bottom of the hole, the flexible sack is sealed to the end of the tubing at the bottom of the hole so that the sack rests against the bottom and side walls of the hole. A packer is provided between the tubing and the casing or the earth formation adjacent the upper end of the sack so as to confine the sack between the packer and the bottom of the hole and thereby prevent any substantial vertical expansion thereof so that when hydraulic pressure is applied to the fluid in the sack, vertical fracturing of the walls of the bore hole at the level of the sack is effected. In the absence of an impervious liner, the pressurizing fluid will enter these horizontal planes and exert a strong vertical force producing horizontal fractures. However, when using a liner the force is confined within the liner and directed principally in a horizontal direction against the entire vertical wall of the packed off borehole to produce vertical fractures because the tremendous force exerted tends to stretch the borehole radially so that the resulting fractures must be vertical in order to permit expansion of the borehole. Probably the formation actually fractures under the fracturing pressure before the sack ruptures as it would be difficult to cause rupturing of the sack unless a crack or fissure develops behind the sack wall. Additional information and theory on fracturing may be found in an article entitled "Vertical Hydraulic Fracturing" in the Oil and Gas Journal of August 9, 1954, beginning at page 104.

In the fracturing of a formation in a borehole at a substantially higher elevation than the bottom of the hole, a sack is positioned on a section of the tubing at the level of the formation and holes are provided in the walls of the tubing enclosed within the sack. Packers are positioned between the tubing and the wall of the formation adjacent the upper and lower ends of the sack so as to confine the same and provide for fracturing of the formation surrounding the sack when sufficient hydraulic pressure is applied within the sack. In each instance, the sack is generally of a length substantially that of the thickness of the formation to be fractured, although it may be of any desired length. Suitable materials for fabricating the sack include natural rubber, synthetic rubber, polyethylene, Marlex (a Phillips Petroleum Company trademark), Teflon, and any non-porous flexible material of sufficient sealing strength to withhold the hydraulic pressure built up within the sack and supporting formation until the same reaches a suitable level sufficient for fracturing the formation. When using rather elastic materials such as rubber in the sack, the size of the sack is sufficient to allow its vertical wall to contact the surrounding earth formation during build-up of pressure.

In another embodiment, a strong relatively inflexible container fabricated of a metal, an alloy, a strong hard plastic or resin, or other suitable material in a suitable form, such as a cylinder or sphere, is positioned in the well on the end of the tubing and hydraulic pressure is built up therein to cause an explosive rupturing of the container with sudden impact of fluid on the walls of the formation and fracturing thereof. The strength of the container can be regulated to produce the desired bursting pressure which must, of course, be a fracturing pressure or result in such a pressure.

In applications where the sack can be readily removed from the bore hole, it is preferred to use oil-insoluble material. In a situation where a thermo-setting resin or other plastic material is utilized it may be desirable to use an oil-soluble material, especially where it cannot be readily removed from the hole with the tubing.

For a more complete understanding of the invention reference may be had to the accompanying drawing of which Figure 1 is a sectional elevation of a bore hole in which the device of the invention is installed; Figure 2 is a partial sectional elevation of another embodiment of the invention positioned in a bore hole opposite an oil formation above the bottom of the bore hole; and Figure 3 is a sectional elevation of the detail of a bag fastening and sealing device. The drawing is schematic and corresponding parts are correspondingly numbered in the three views.

Referring to Figure 1, a bore hole 10 is provided with a casing 12. A well tubing 14 extends from the ground surface to the level of an oil-bearing formation 16. A flexible sack 18 is attached to the lower end of tubing 14 in sealed relation therewith by a suitable clamping and sealing means firmly compressing the open end of the sack against the tubing. Fluid enters the sack from the lower open end of the tubing. A packer 20 of conventional design is positioned at the upper end of the sack so as to seal off the annulus between the tubing and the wall of the formation and thereby prevent substantial upward expansion of the sack when hydraulic pressure is applied therein. Obviously the casing 12 may be extended into the bore hole to the level of the lower side of the packer so that the packer contacts the lower end of the casing instead of the wall of the bore hole.

The upper end of tubing 14 is connected thru well head 21 to one or more supply tanks 22 by means of conduit 24 in which is positioned hydraulic pump 26. Supply tank 22 serves to provide a suitable hydraulic fluid such as oil for the fracturing process. In case oil and sand are to be injected into the well the suspension is prepared in tank 22 by suitable stirring means not shown. Obviously any number of pumps may be connected by a number of conduits 24 to the well head or to tubing 14 by means of a suitable manifold in applications where extremely rapid injection of the hydraulic fluid is desired or required.

Referring to Figure 2, tubing 14 extends beyond the oil-bearing formation 28, or at least beyond the region to be fractured, and the lower end is closed by means of a cap 30. Sack 18 surrounds the section of tubing 14 at the level of formation 28. The section of tubing 14 within sack 18 contains one or more holes or perforations in order to allow the hydraulic fluid to pass from the tubing into the sack and, after bursting of the sack, into the formation surrounding the same. Packers 20 seal off the annulus surrounding the tubing 14 and are positioned adjacent the ends of the sack. Of course, sack 18 is connected at each end to the tubing in sealed relation therewith by suitable sealing means, the detail of which is shown and described fully with reference to Figure 3. Here again the casing 12 may extend far enough to catch the upper packer 20 as indicated in connection with Figure 1.

Figure 3 shows one embodiment of a clamping and sealing means for attaching sack 18 to the well tubing, which comprises a threaded nut 34 on a threaded pipe end 35. An annular depression in the outer surface of nut 34 adjacent the bag cooperates with annular engaging member 36 which is forced against sack 18 by means of threaded nut 38 to form a seal and firmly retain the bag against internal hydraulic pressure. Any suitable sealing and clamping means which performs these functions may be used. The sealing device shown in Figure 3 is utilized at each end of the bag in the application shown in Figure 2 and at the open end of the bag of Figure 1. Openings 39 in the section of tubing 14 within bag 18 provide an inlet for fluid to flow into the bag.

It is also feasible to extend the casing thru the region to be fractured so that the bag contacts the wall of the casing, in which case either slots or other openings should be made in the casing surrounding the sack in a suitable pattern. Instead of holes or slots, weakened areas in the casing which break out under a suitable pressure may be utilized. This facilitates the fracturing thru the casing wall and assists in controlling the fracture pattern. The described modification is applicable to the apparatus of either Figure 1 or Figure 2. In application to Figure 2 both packers contact the wall of casing 12.

In operation when the device of the invention is in proper position in the bore hole, hydraulic fluid, such as crude oil or refined oil with or without suspended sand therein, is pumped from supply tank 22 thru conduit 24 by means of pump 26 thru the well head 21 and into tubing 14 from which it passes into sack 18. When sufficient hydraulic pressure has been built up in sack 18 the same bursts and the force of the liquid vertically fractures the formation surrounding the sack permitting flow of liquid into the formation. After fracturing, where sand is used in the fracturing step the same may be driven deeply into the formation by a flushing oil or other liquid to facilitate flow of oil from the formation into the bore hole.

The method of positioning the sack and packers in the desired location in the bore hole should be obvious to anyone skilled in the art and further discussion is considered unnecessary.

The invention has the advantage of greatly reducing the amount of hydraulic fluid and sand required to effect the desired fracturing since no loss to the porous zone surrounding the sack is encountered while the pressure is being built up. Plugging of the porous zone with sand before the fracturing is effected is also avoided. In addition, the process and apparatus of the invention are highly effective in producing vertical fracturing in contrast to horizontal fracturing, thereby increasing production of the oil-bearing formation because of the opening up of even the less porous sections of the formation.

Certain modifications of the invention will become apparent to those skilled in the art and the illustrative details disclosed are not to be construed as imposing unnecessary limitations on the invention.

I claim:

1. A process for effecting vertical fracturing of a well comprising placing in the well bore at the depth of a potentially productive formation a tough flexible vertically elongated sack extending over a substantial proportion of the thickness of said formation, said sack being of sufficient strength to allow build-up of fracturing pressure against the wall of said well bore and incapable of sustaining said pressure when said wall fractures; confining said sack within vertical limits so as to prevent substantial vertical expansion of same; filling said sack with liquid so as to force same to take the shape of the surrounding well bore; applying hydraulic pressure to the liquid within said sack so as to build up fracturing pressure and cause vertical fracturing of the wall of said bore surrounding said sack; and, without interruption, continuing the application of pressure within said sack so as to rupture same and force said liquid into fractures in said formation, thereby extending the fractures deeper into said formation.

2. The process of claim 1 wherein said sack is confined against the bottom of said bore.

3. The process of claim 1 wherein said sack is confined between packers at a level remote from the bottom of said bore.

4. The process of claim 1 wherein said liquid comprises oil.

5. The process of claim 4 wherein sand is incorporated in said oil.

6. The process of claim 1 wherein said sack is confined between packers in a casing in said well and the wall of the casing between said packers contains areas of low resistance to pressure compared to that of the surrounding casing.

7. The process of claim 6 wherein said areas of low resistance comprise holes in the casing.

8. A process for effecting fracturing in an earth formation in a well comprising placing in the well bore at the depth of the formation to be fractured a container separate from any well casing therein capable of retaining a hydraulic fluid under fracturing pressures against the wall of said well bore but incapable of sustaining said pressures when said wall fractures; confining said container within vertical limits; filling said container with hydraulic fluid so as to force same to take the shape of the surrounding well bore; applying and increasing hydraulic pressure within said container until fracturing pressures are reached and fracturing of said formation occurs thereby allowing said container to rupture; and continuing application of hydraulic pressure thru said sack into said formation so as to extend the fractures deeper into said formation.

References Cited in the file of this patent

UNITED STATES PATENTS

| | | |
|---|---|---|
| 1,523,286 | Railsback | Jan. 13, 1925 |
| 1,828,381 | Schuyler | Oct. 20, 1931 |
| 2,314,540 | Huntington | Mar. 23, 1943 |
| 2,479,394 | Montgomery | Aug. 16, 1949 |
| 2,504,462 | Sprague et al. | Apr. 18, 1950 |
| 2,596,844 | Clark | May 13, 1952 |
| 2,642,142 | Clark | June 16, 1953 |
| 2,687,179 | Dismukes | Aug. 24, 1954 |

FOREIGN PATENTS

| | | |
|---|---|---|
| 623,870 | Germany | Jan. 6, 1936 |
| 756,396 | France | Sept. 25, 1933 |